United States Patent [19]

Hendricks

[11] Patent Number: 4,645,147

[45] Date of Patent: Feb. 24, 1987

[54] INGRESS AND EGRESS SYSTEM FOR AN AIRCRAFT

[75] Inventor: Klaas Hendricks, Granada Hills, Calif.

[73] Assignee: Lockheed Corporation, Calabasas, Calif.

[21] Appl. No.: 786,989

[22] Filed: Oct. 15, 1985

[51] Int. Cl.[4] .......................... B64C 1/22; B64D 11/06
[52] U.S. Cl. .............................. 244/137 P; 244/118.5; 244/122 R; 244/122 A
[58] Field of Search ............ 244/122 R, 122 A, 118.5, 244/118.6, 137 R, 137 P; 187/19, 64, 65, 62, 9 E; 414/921

[56] References Cited

U.S. PATENT DOCUMENTS

| | | | |
|---|---|---|---|
| 2,806,667 | 9/1957 | Kugler | 244/141 |
| 2,829,850 | 4/1958 | Culver | 244/141 |
| 2,904,201 | 9/1959 | Rhodes | 187/9 E |
| 2,985,413 | 5/1961 | Widmanstetter | 244/118.6 |
| 3,174,634 | 3/1965 | Peck | 187/9 E |
| 3,811,643 | 5/1974 | Pizzo | 244/137 P |

Primary Examiner—Galen Barefoot
Attorney, Agent, or Firm—Louis L. Dachs

[57] ABSTRACT

The invention is a system for ingressing and egressing a crew member from the flight station of an aircraft. A passageway is provided having a first end coupled to the flight station and a second end terminating at the underside of the aircraft. A crew seat assembly is movably mounted in the aircraft, movable from a first position within the flight station, for example, at the pilot's controls in a single-seater fighter aircraft, to a second position located such that the crew member can gain access to the crew seat assembly from the ground. This second position is typically at least partially out of the aircraft and, preferably, completely out. A positioning mechanism is mounted within the aircraft for moving the crew seat assembly from the first position to the second position. A door is provided at the second end of the passageway for sealing off the passageway from the exterior of the aircraft.

11 Claims, 13 Drawing Figures

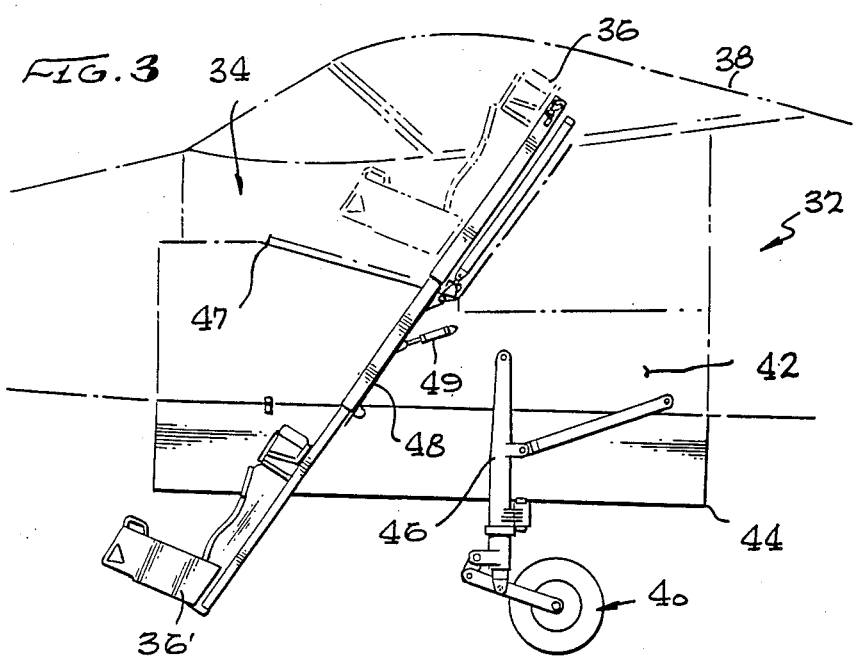
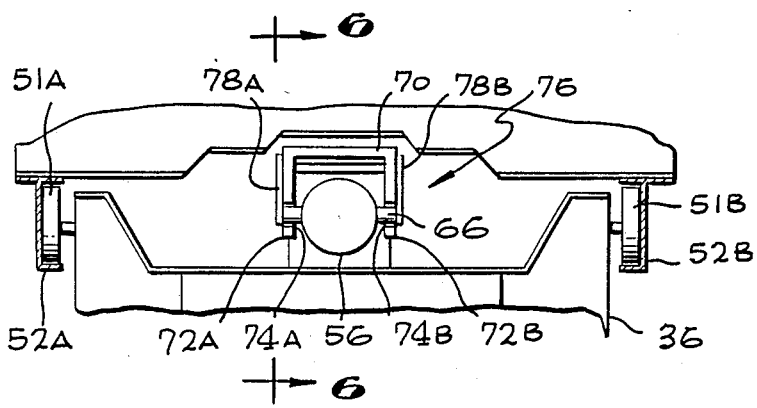
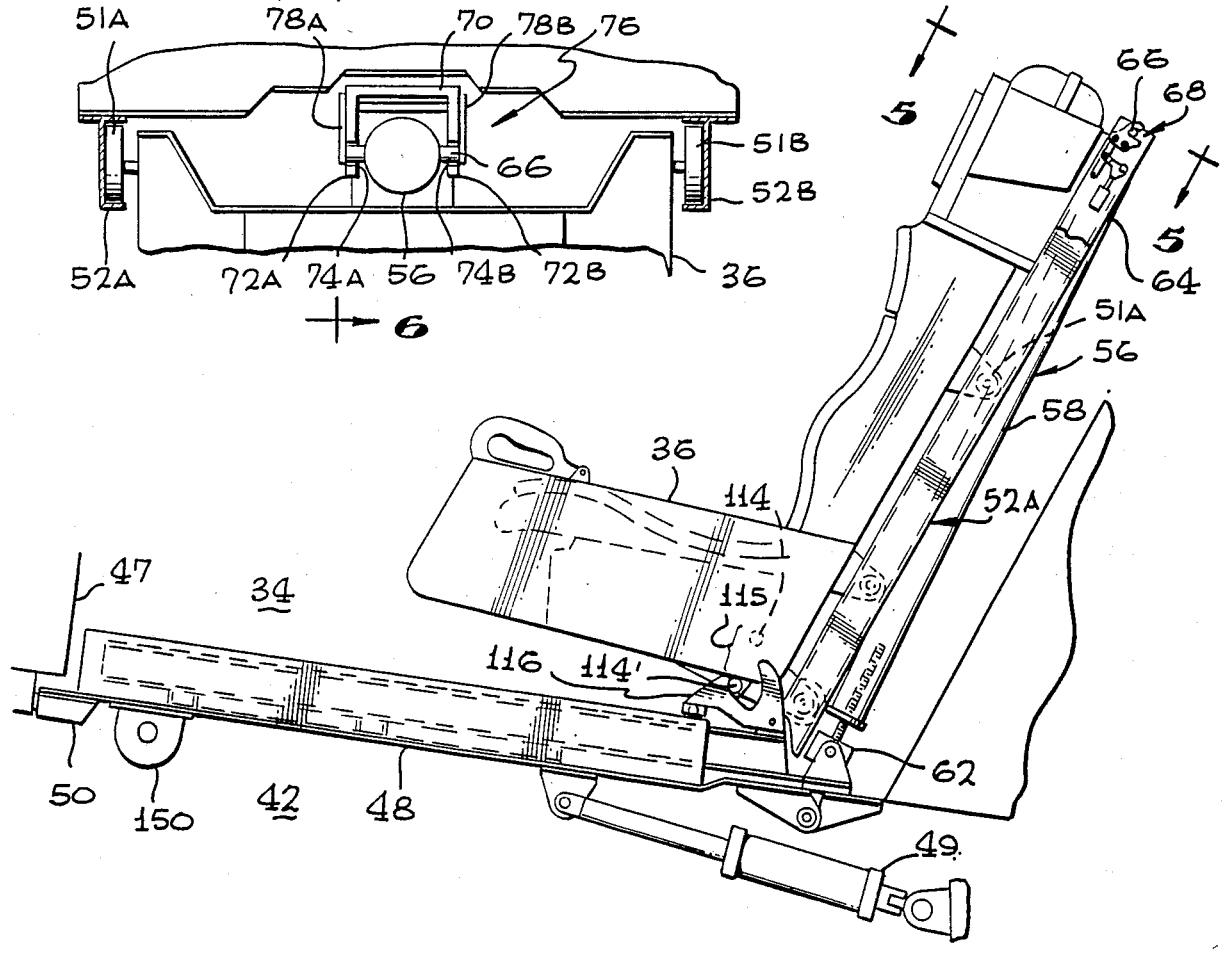

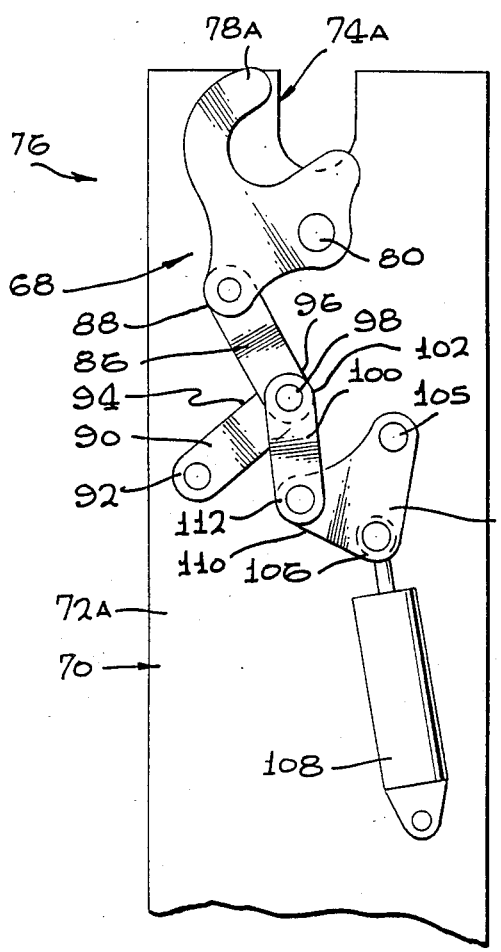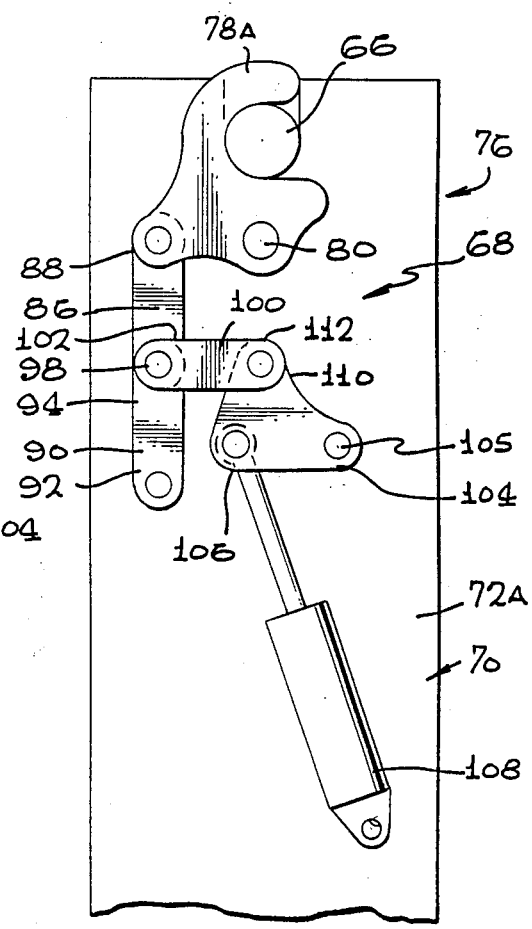

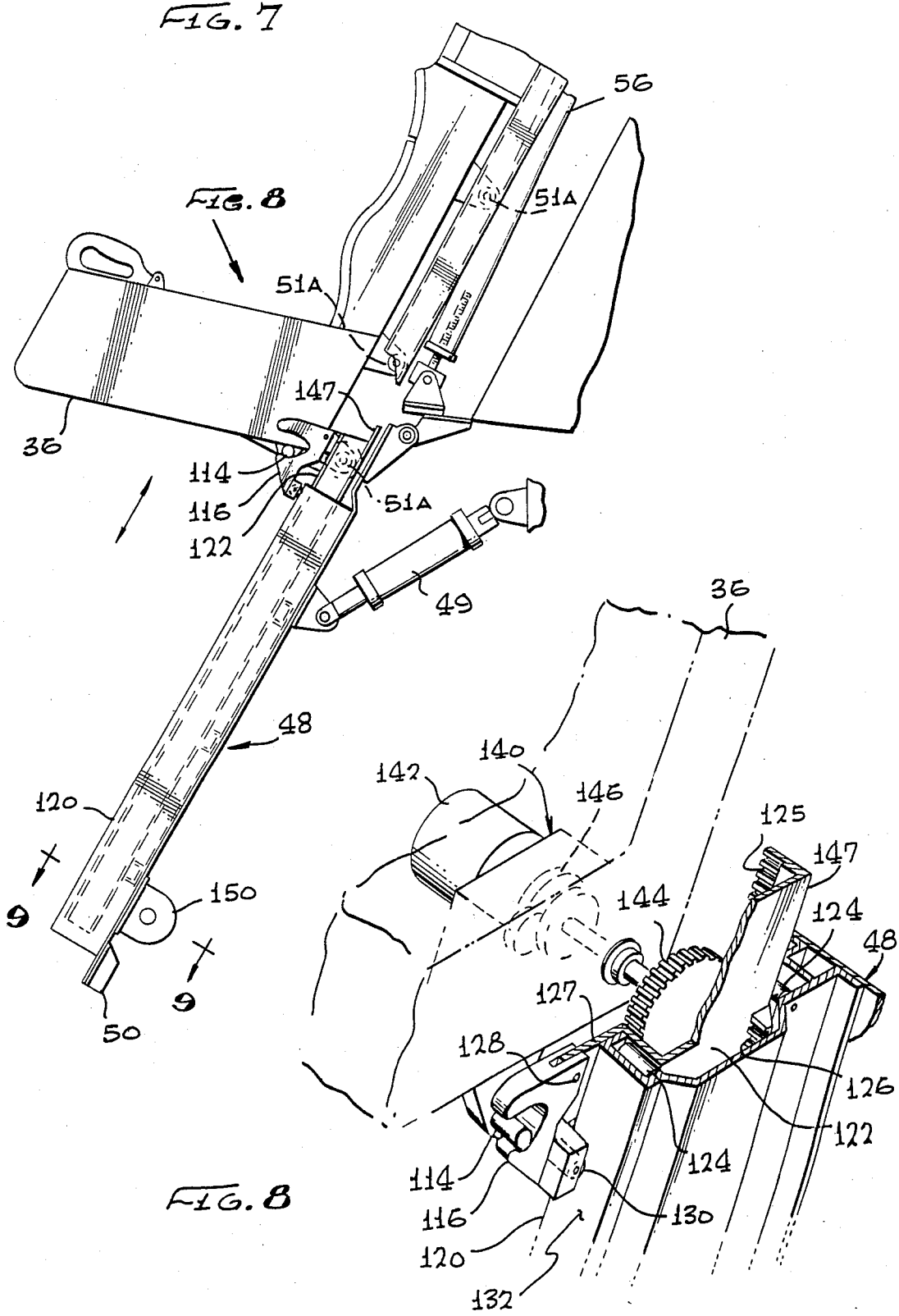

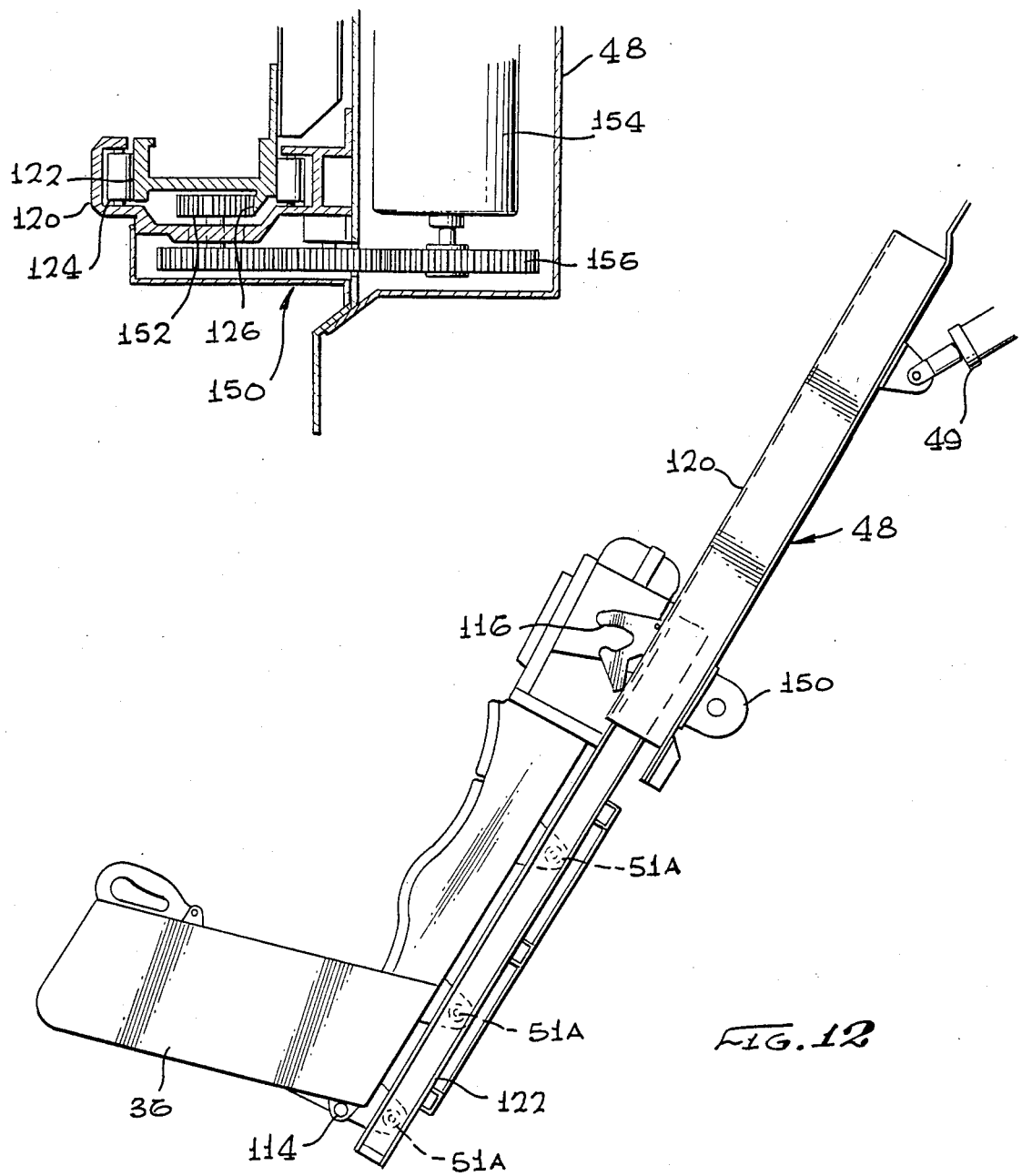

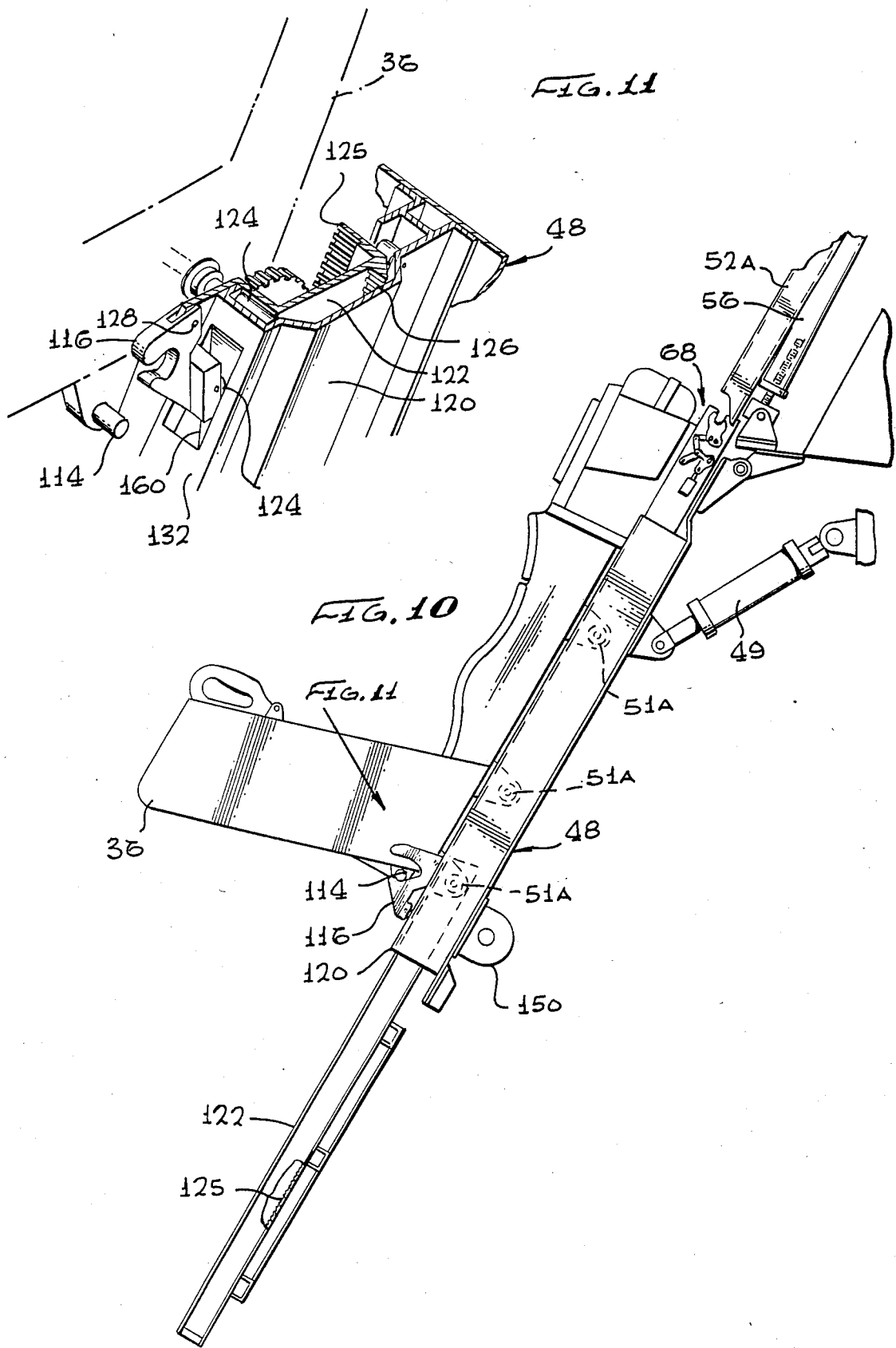

INGRESS AND EGRESS SYSTEM FOR AN AIRCRAFT

TECHNICAL FIELD

The invention relates to the field of ingress and egress systems for aircraft and, in particular, to a system for automatically doing so from the bottom of the aircraft.

BACKGROUND INFORMATION

The typical method of ingressing and egressing from the cockpit or flight station of an aircraft, particularly a single or two-seater fighter aircraft, is to open the canopy and climb out. Usually the canopy is pivoted from a point behind the pilot, such as on the McDonald Douglas F4 fighter, or from the side as in the case of the Lockheed Corporation F-104 Fighter, or the canopy is slid back on rails as in many older WW II fighter aircraft. But no prior art system provided for automatic ingress and egress from the cockpit.

One of the problems with opening canopy ingress and egress systems is that the cockpit or flight station is at a considerable height above the ground and, thus, a ladder is required to reach the flight station. The ladder is typically ground support equipment. Additional ground support equipment is often necessary for ground crew personnel to assist the pilot get properly installed.

However, many fighter aircraft are designed to operate from "unprepared fields" where ground support equipment may not be readily available. Thus, sometimes the ladder is designed to be stored on board the aircraft and is manually or automatically extended when required. Another approach is to incorporate flush mounted steps and hand holds on the side of the aircraft. These are typically recesses with spring-loaded covers.

While having the ladder incorporated into the aircraft or the use of flush mounted foot and hand holds eliminates the problem of providing ground support equipment it creates another problem. On future aircraft, the number of access panels or hatches will have to be kept to a minimum in order to provide a smooth and continuous external contour. An additional requirement will be to integrate the canopy structure into the fuselage. Thus such systems should be avoided, if possible. Furthermore, it will be extremely desirable to maintain the environmental integrity of the flight station while the aircraft is on the ground. Such integrity could not be maintained if the canopy had to be opened every time the pilot ingressed and egressed from the aircraft.

Thus, a primary object of the subject invention is to provide a system for ingressing and egressing a crew member from the flight station of an aircraft.

Another primary object of the subject invention is to provide a system for ingressing and egressing a crew member from the flight station of an aircraft having a canopy without requiring the opening thereof.

A further object of the subject invention is to provide a system for automatically ingressing and egressing a crew member from the flight station of an aircraft.

A still further object of the subject invention is to provide a system for ingressing and egressing a crew member through the landing gear wheel well of an aircraft, thus limiting the number of external hatches or doors.

An additional object of the subject invention is to provide a system for ingressing and egressing a crew member from the flight station of an aircraft without unduly affecting the environmental integrity of the flight station.

DISCLOSURE OF THE INVENTION

The invention is a system for ingressing and egressing a crew member from the flight station of an aircraft. A passageway is provided having a first end coupled to the flight station and a second end terminating at the underside of the aircraft. A crew seat assembly is movably mounted in the aircraft, movable from a first position within the flight station, to a second position located such that the crew member can gain access to the crew seat assembly from the ground. This second position is typically at least partially out of the aircraft and preferably completely out.

A positioning mechanism is mounted within the aircraft for moving the crew seat assembly from the first position to the second position. A door is provided at the second end of the passageway for sealing off the passageway from the exterior of the aircraft. The positioning mechanism can be a simple telescoping support frame operated by electric motors or the like.

If the aircraft has a retractable nose landing gear and the flight station is located approximately above the nose wheel compartment, the compartment can serve as the second end of the passageway with the compartment door serving as a door for closing off the passageway. In such a preferred embodiment, a second door for sealing off the flight station from the compartment is incorporated.

A preferred positioning mechanism would make use of the second door between the flight station and compartment. Here, a first guide track is rigidly mounted within the flight station. A second guide track is rigidly mounted to the second door. A third guide track is slidably mounted to the second guide track and when the second door is in the open position is alignable with the first guide track and translatable from a first position within the second guide track to a second position extending partially out of the second guide track.

A first power means is mounted to the second door for translating the third guide track from the first position to the second position when the second door is in the open position. Coupling means are mounted to the third guide track in detachable engagement with the seat for moving the seat in unison with the third track when the third track translates from the first position to the second position. A plurality of rollers are rotatively mounted to the seat assembly for guiding the seat from the first position to the second position which are movable along the first and third guide tracks when the second door is in the second position. A second power means is mounted to the seat assembly for moving the seat assembly along the third track.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

BRIEF DESCRIPTION OF THE DRAWINGS

Illustrated in FIG. 1 is a partial side-elevation view of an aircraft incorporating the subject Ingress and Egress System.

Illustrated in FIG. 2 is a cross-sectional view of the aircraft shown in FIG. 1 taken along the line 2—2.

Illustrated in FIG. 3 is a partial side-elevation view of an aircraft incorporating a second embodiment of the subject Ingress and Egress System.

Illustrated in FIG. 4 is an enlarged view of a portion of the Ingress and Egress System shown in FIG. 3.

Illustrated in FIG. 5 is a cross-sectional view of a portion of the Ingress and Egress System shown in FIG. 4 taken along the line 5—5.

Illustrated in FIGS. 6A and 6B are enlarged views of a portion of the Ingress and Egress System shown in FIG. 4 taken along the line 6—6.

Illustrated in FIG. 7 is a view of the Ingress and Egress System shown in FIG. 4 at the start of the extension cycle.

Illustrated in FIG. 8 is a partial perspective view of a portion of the Ingress and Egress System shown in FIG. 7 taken along the direction of arrow 8.

Illustrated in FIG. 9 is a cross-sectional view of the Ingress and Egress System shown in FIG. 7 taken along the line 9—9.

Illustrated in FIG. 10 is a view of the Ingress and Egress System shown in FIG. 4 approximately halfway through the extension cycle.

Illustrated in FIG. 11 is a partial perspective view of the Ingress and Egress System shown in FIG. 10 taken along the direction of arrow 11.

Illustrated in FIG. 12 is a cross-sectional view of the Ingress and Egress System shown in FIG. 4 in the fully extended position.

BEST MODE OF CARRYING OUT THE INVENTION

Figure 1:
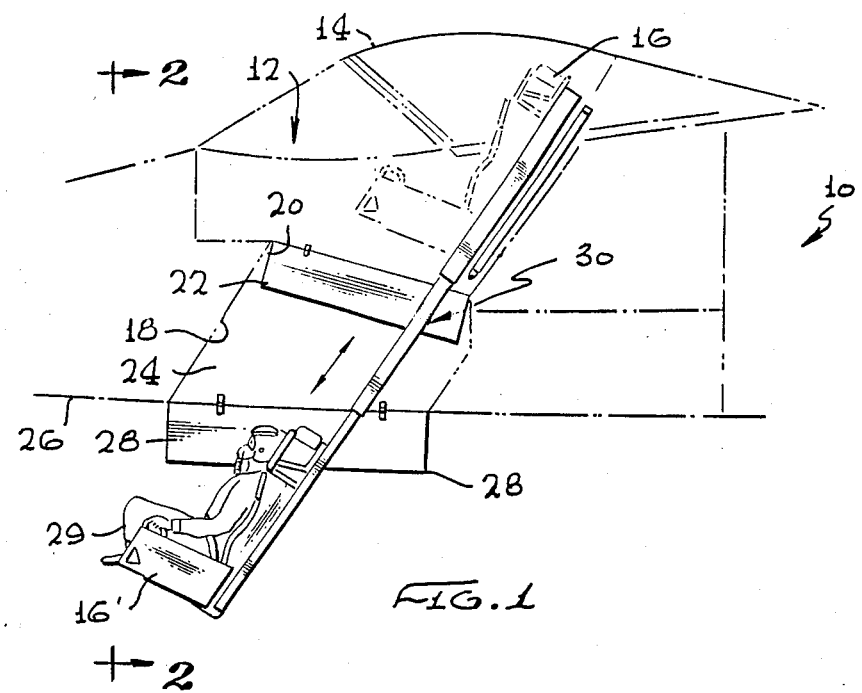
Figure 2:
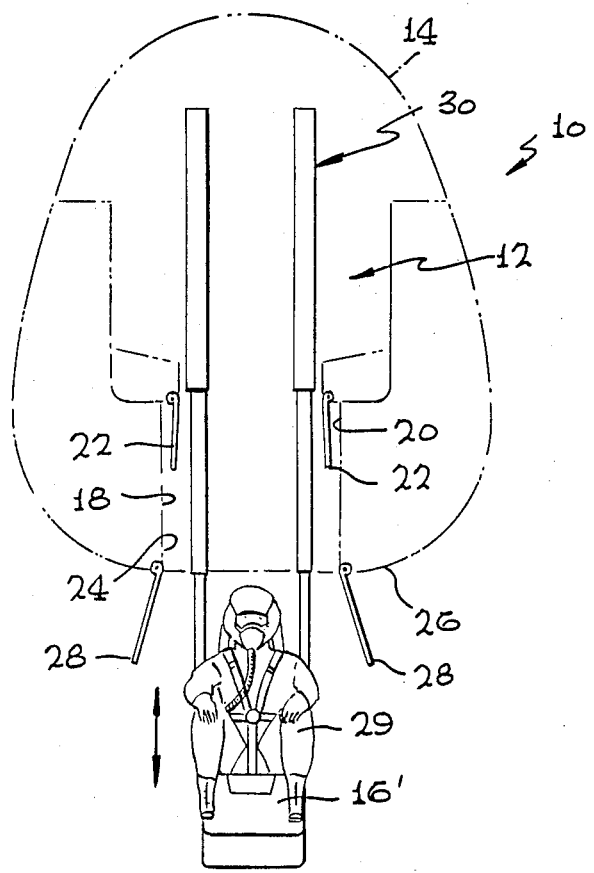

Illustrated in FIG. 1 is a partial side-elevation view of an aircraft, generally designated by numeral 10, while illustrated in FIG. 2 is a cross-sectional view of the aircraft shown in FIG. 1 along the line 2—2. It can be seen that the aircraft 10 has a flight station 12 enclosed by a canopy 14. Mounted within the flight station is a crew seat assembly 16. In this embodiment the crew seat is shown in the pilot's position and it should be understood that the subject system could be used for other crew members, if any.

Below the flight station is a passageway 18 having a first end 20 coupled to the flight station 12 with a door 22 for sealing off the flight station therefrom. The passageway 18 terminates at its second end 24 at the bottom 26 of the aircraft, wherein doors 28 are provided for sealing off the passageway from the exterior environment. If the bottom of the flight station is near the bottom of the aircraft, then the door 22 may be eliminated.

The crew seat assembly 16 is movable from a first position shown within the flight station 12 to a second position, indicated by numeral 16', extending out of the bottom of the aircraft. While the seat assembly 16' is shown completely out of the aircraft in the second position, it need only extend to a point wherein it is accessible by the crew member 29 and necessary ground support personnel to aid the crew member to become properly situated in and hooked up to the seat assembly. Thus, in certain designs it may not be necessary for the seat assembly to completely clear the bottom of the aircraft. A mechanism is provided for raising and lowering the seat assembly 16 and, as illustrated, is a simple telescoping electrically powered carriage assembly, generally indicated by numeral 30.

Thus, the crew member can easily enter the aircraft from the ground without the aid of ladders, handholds, or footholds in the side of the aircraft. Furthermore, ingress and egress is accomplished without requiring the opening of the canopy.

Illustrated in FIG. 3 is a second embodiment of the invention. The airplane 32 also has a flight station 34, crew seat assembly 36 mounted therein, and canopy 38 thereover and, additionally, a nose wheel landing gear assembly, generally indicated by numeral 40, mounted approximately below the flight station. The landing gear assembly comprises a compartment 42 having doors 44 and a landing gear 46 storable therein. A passageway 47 connects the flight station 34 with the compartment 42 and incorporates a door 48 adapted to seal off the flight station from the compartment when in the closed position. The door 48 is actuated by hydraulic cylinder 49 and is locked in the closed position by a solenoid operated latch 50 (not shown in detail).

Still referring to FIG. 3 and additionally to FIG. 4 which is an enlargement of the Ingress and Egress System shown in FIG. 3 and additionally to FIGS. 5, 6A and 6B which illustrate details thereof, it can be seen that the crew seat 36 incorporates a plurality of rollers 51A and 51B on either side of the back thereof, which slideably engage guide tracks 52A and 52B, respectively, mounted in the flight station 34.

The seat assembly 36 is adjustable by means of rocket assembly 56 (used to eject the pilot seat assembly out of the aircraft in emergency conditions). The rocket assembly 56 incorporates a rocket 58 which is in detachable engagement with an electrically powered jack screw 62 pivotally attached to aircraft structure. The top end 64 of the rocket 58 terminates in a T-bar fitting 66. The T-bar 66 is in detachable engagement with an over-center latch assembly 68 attached to the seat assembly 36. Thus, when ejection is required, firing of the rocket will drive the seat assembly out of the aircraft (the canopy having been previously ejected or the transparent portion having been fragmented) with the rollers 51A and 51B in contact with guide tracks 52A and 52B, respectively.

Referring particularly to FIGS. 6A and 6B, the latch assembly 68 comprises a channel member 70 having leg portions 72A and 72B with a pair of notches 74A and 74B thereon in position to receive the T-bar 66 of the rocket assembly 56. An over-center latch 76 is mounted to the channel member 70 which comprises a pair of hooks 78A and 78B for engaging the T-bar 66 are attached to a pin 80 which is rotatively mounted to the leg portions 72A and 72B. The latch 76 comprises a first link 86 which is rotatively coupled to the hook 78A at its first end 88. A second link 90 is pivotally mounted to leg portion 72A at its first end 92 and rotatively coupled at its second end 94 to the second end 96 of the first link 86 (at a pivot point 98). A third link 100 is pivotally mounted by its first end 102 to the first and second likes at pivot point 98. A fourth link 104 is pivotally attached at its middle portion 105 to the leg portion 72A, by its first end 106 to an actuator 108 and by its second end 110 to the second end 112 of the third link 100.

In operation, as the T-bar 66 contacts the hooks 78A and 78B, the hooks are rotated causing the first and second links 86 and 90 to become vertically aligned. This causes third link 100 to extend perpendicularly to links 86 and 90 and into an over-center relationship with fourth link 104. Activation of actuator 108 produces the over-center position shown in FIG. 6B. Thus, the hooks 78A and 78B cannot disengage from the T-bar 66 until the actuator 108 is retracted.

Referring back to FIGS. 4 and 5 and, additionally, to FIG. 7, it can be seen that the position of the crew seat assembly 36 within the flight station 34, can be adjusted for height by means of jack screw 62. In doing so, the position of a rod 114 on the seat assembly 36, moves up or down a distance indicated by bracket 115. Upon initiation of the egress cycle, the seat assembly is automatically lowered to a position below the normal adjustment range until the rod, indicated by numeral 114', comes within a forked hook 116 mounted to the door 48.

The door 48 includes a stationary guide track 120 in which a guide track 122 is movably mounted therein and supported by rollers 124. The guide track 122 incorporates an internal rack gear 125 and an external rack gear 126 (the use of which will be subsequently discussed). The forked hook 116 is pivotally attached to arm 127 of the guide track 120 by means of a pin 128. The hook 116 incorporates a roller 130 which rides on surface 132 of guide track 120 and, thus, the hook 116 is prevented from rotating about the pin 128.

The seat assembly 36 incorporates a pinion gear drive assembly, generally indicated by numeral 140, which comprises an electric motor 142 for driving a pinion gear 144 via a gear assembly 146. As the door 48 moves to the open position shown in FIG. 7, the end 147 of the movable guide track 122 becomes aligned with stationary guide track 52A and the pinion gear 144 becomes engaged with the top portion of the rack gear 125. Additionally, at least one of the rollers 51A engages the guide track 120. To aid in the engagement of the pinion gear 144 with the rack gear 125, the rack gear teeth at the end 147 of the guide track 122 may have teeth tapered in height. In any case, the seat assembly 36 is held in place by the hook 116.

Referring now to FIG. 9 which is a cross-sectional view of the door along the line 9—9, it can be seen that a second pinion gear drive assembly 150 is incorporated in the door 48, having a pinion gear 152 engaged with rack gear 126 of the guide track 122. The pinion gear 152 is driven by an electric motor 154 via a second gear assembly 156. The gear drive assembly 150 is used to drive the guide track 122 down the guide track 120 such that the guide track 122 is extended to the position shown in FIG. 10.

Referring now to FIG. 11, it can be seen that as the hook 116, which has been pulling the seat assembly 36 down across the door 48, comes to the bottom of the guide track 120, the roller 124 engages a ramped groove 160 on the surface 132, which allows the hook 116 to rotate down about the pivot point of pin 128, releasing the rod 114 mounted on the seat assembly 36. Thereafter, the drive assembly 150 (shown in FIG. 8) is actuated driving the seat assembly 36 (via pinion gear 144 and rack gear 126) to the position shown in FIG. 12 (also shown in FIG. 3 with the seat indicated by numeral 36').

While the discussion of the system has in general been limited to the left side of the crew seat assembly, it must be understood that the door 48 incorporates a substantially identical system on the right-hand side of the seat assembly 36. The only difference would be that the guide track 122 would not have the first and second rack gears, since only one each of the drive assemblies 140 and 150 would normally be necessary.

Thus, in order to egress from the aircraft, the crew member would initiate an actuating switch mounted on the seat (not shown). Thereafter:

1. seat assembly 36 would be lowered by means of jack screw 62 so that the rod 114 would engage forked hook 116.

2. The door 48 is then opened by the release of latch 50 and retraction of hydraulic cylinder 49. As the door 48 opens, the seat 36 is lowered, such that, at least one roller 51A engages the track 122, and pinion gear 144 of the drive assembly 140 engages the rack gear 125.

3. The drive assembly 150 is actuated causing the guide track 122 to translate along guide track 120. Upon reaching the end of travel, the roller 130 on forked hook 116 rides into groove 160 allowing the hook 116 to disengage from the rod 114.

4. The drive assembly 140 is then actuated causing the seat assembly 36 to travel down the guide track 122 to the fully extended position. Ingress to the flight station, is essentially accomplished by the reverse of the procedure outlined above.

Thus, the main objects of the invention are achieved.

A. No ground support equipment such as ladders is required.

B. The number of openings in the aircraft's exterior is not increased since ingress and egress is accomplished via the nose landing gear compartment.

C. Canopy integrity is maintained allowing better integration into the airframe.

D. The environmental integrity of the flight station can be maintained while the crew member ingresses and egresses the flight station since a positive differential pressure within the flight station can be easily accomplished.

While the invention has been described with reference to particular embodiments, it should be understood that the embodiments are merely illustrative as there are numerous variations and modifications which may be made by those skilled in the art. Thus, the invention is to be construed as being limited only by the spirit and scope of the appended claims.

Industrial Applicability

The invention has application on aircraft, particularly to aircraft where automatic unaided access to the flight station from the ground is desirable.

I claim:

1. A system for ingressing and egressing a crew member from the flight station of an aircraft comprising:
   passage means mounted within the aircraft having a first end coupled to the flight station and a second end terminating at the underside of the aircraft;
   a crew seat assembly movably mounted within the aircraft, said seat assembly movable from a first position within the flight station, via said passage means, to a second position located such that the crew member can obtain access to said seat assembly from the ground; and
   positioning means mounted in said aircraft for moving said seat assembly from said first position to said second position.

2. The system of claim 1 further including a door mounted to the underside of the aircraft for sealing off said passage means from the exterior of the aircraft.

3. The system of claim 2 wherein the aircraft further includes a nose landing gear means comprising a retractable nosewheel landing gear, a compartment for storing the landing gear in the retracted position and compartment doors for sealing off the compartment from the exterior of the aircraft, said system further including:
   said second end of said passage means including the compartment;
   said door means are the compartment doors; and
   said second position of said seat assembly extends at least partially into the compartment.

4. The system of claim 3 further including isolation means to environmentally seal the flight station from said passage means when said seat assembly is in said first position.

5. The system of claim 4 wherein said isolation means is a second door rotatably mounted at said first end of said passage means movable from a closed position isolating said passage means from said flight station to an open position.

6. The system of claim 5 wherein said positioning means comprises:
   said second door;
   a first guide track rigidly mounted within said flight station;
   a second guide track rigidly mounted to said second door;
   a third guide track slidably mounted to said second guide track and alignable with said first guide track and translatable from a first position within said second guide track to a second position extending partially out of said second guide track, when said second door is in said open position;
   coupling means mounted to said third guide track and in detachable engagement with said seat assembly for moving said seat assembly in unison with said third track when said third track translates from said first position to said second position;
   a plurality of rollers rotatively mounted to said seat assembly for guiding said seat assembly from said first position to said second position movable along said first and third guide tracks when said second door is in said open position;
   first power means mounted to said second door for translating said third guide track from said first position to said second position when said second door is in said open position; and
   second power means mounted to said seat assembly for moving said seat assembly along said third track to said second position.

7. The system of claim 6 wherein said first power means comprises:
   said third guide track having a first rack gear;
   a pinion gear engaging said first rack gear; and
   a first motor mounted to said second door for driving said pinion gear.

8. The system of claim 7 wherein said second power means comprises:
   said third guide track having a second rack gear;
   a second pinion gear positioned on said seat assembly such that it is engaged with said second rack gear when said second door is in said open position; and
   a second motor mounted to said seat for driving said second pinion gear.

9. The system of claim 8, wherein, disciplinary means is provided to decouple said coupling means from said seat when said third guide track is in said second position.

10. The system of claim 9 wherein:
    said first power means further includes a first gear assembly coupling said first motor to said first pinion gear such that translation of said third guide track along said second guide track can be accomplished only by said first motor; and
    said second power means further includes a second gear assembly coupling said second motor to said second pinion gear such that translation of said seat along said third track can only be accomplished by said second motor.

11. The system of claim 10 further including first and second stop means mounted to said first guide track and said second door, respectively, for limiting said movement of said seat assembly to said first and second positions, respectively.

* * * * *